Patented Sept. 26, 1950

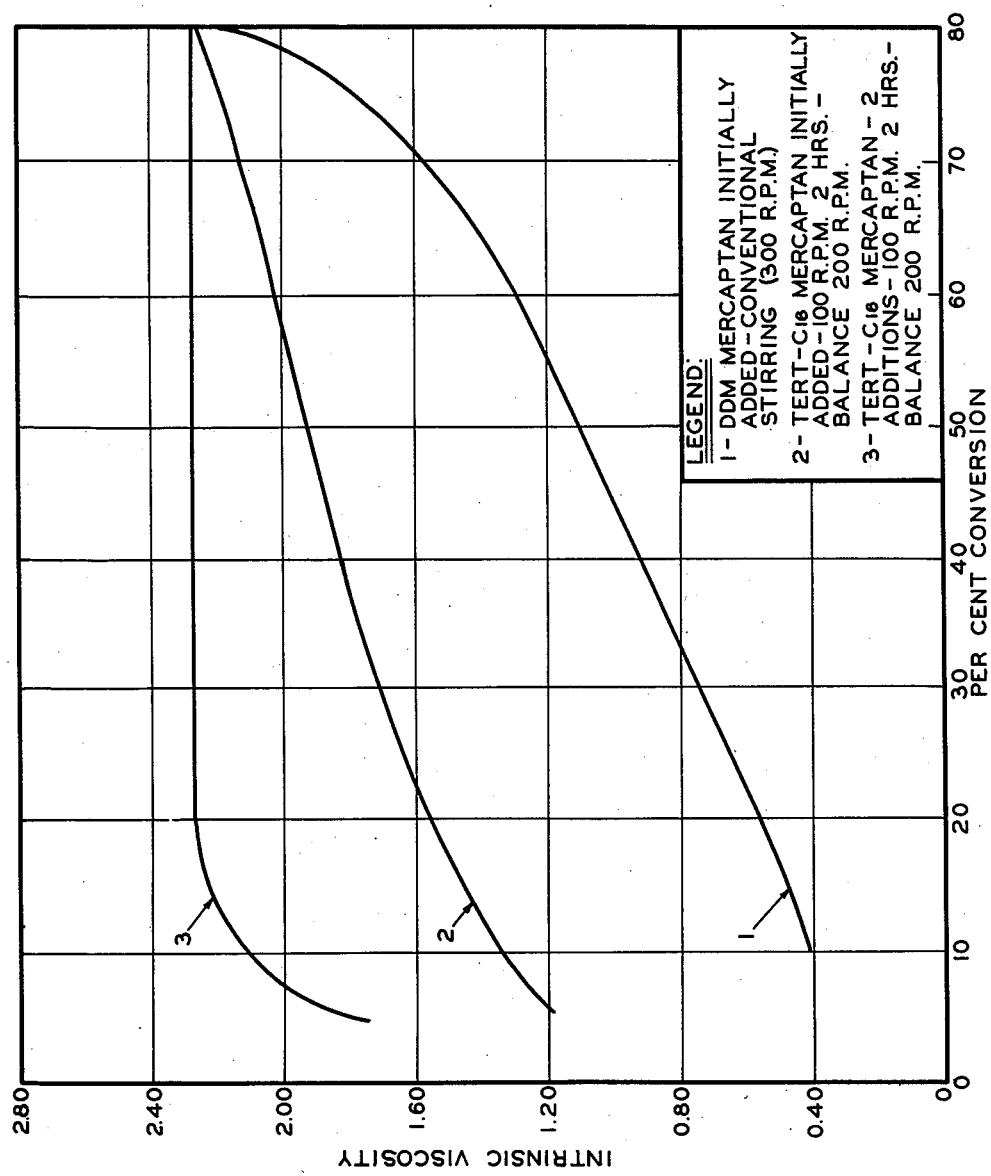

2,523,596

UNITED STATES PATENT OFFICE 2,523,596

EMULSION POLYMERIZATION IN THE PRESENCE OF A MERCAPTAN MODIFIER

Walter A. Schulze, Bartlesville, Okla., and James E. Troyan, Phillips, Tex., assignors to Phillips Petroleum Company, a corporation of Delaware Application June 17, 1946, Serial No. 677,355

3 Claims. (Cl. 260—84.3)

This invention relates to an improved process for the polymerization of a conjugated diolefin in an aqueous emulsion. In one of its more specific aspects it relates to the copolymerization of butadiene and another organic monomer copolymerizable therewith in an aqueous emulsion. The present invention is particularly applicable to the production of synthetic rubber by the emulsion polymerization of butadiene and styrene and similar related comonomer systems.

In the production of synthetic elastomers having rubber-like properties the polymerization of conjugated diolefins is frequently carried out in an aqueous emulsion. Emulsion polymerization has been extensively used for the production of GR–S and similar types of synthetic rubber. Usually a butadiene hydrocarbon, for example, 1,3-butadiene, isoprene, 2,3-dimethyl butadiene, etc., and an unsaturated monomer copolymerizable therewith in an aqueous emulsion are dispersed in water with the aid of a dispersing agent, such as soap. The polymerization of the butadiene hydrocarbon and the other comonomer is carried out in the presence of an oxidation type catalyst, e. g., potassium persulfate, and a suitable modifier, e. g., one or more of the higher molecular weight mercaptans.

The polymerization is effected in a pressure vessel provided with means for temperature control and for agitation of the emulsion during the polymerization period. A temperature within the range of from about 80 to about 125° F. is generally employed. The rate of polymerization and the quality of the copolymer produced is influenced to some extent by the reaction temperature. An increase in reaction temperature results in an increase in the rate at which the polymerization reaction proceeds; on the other hand, as the temperature is increased the physical properties of the polymer may be adversely affected. Higher temperatures usually result in the formation of undesirable benzene-insoluble gel. In the production of GR–S, temperatures have been standardized at about 50° C. (122° F.). When the desired extent of monomer conversion has been attained, about 75 per cent in the case of GR–S, the resulting emulsion of polymer, known as synthetic latex, is removed from the reaction vessel and processed for removal of unconverted monomer and for recovery of the polymer from the serum.

During the course of the polymerization it is customary to control the polymerization, to some extent at least, by the use of chemical materials known as modifiers. The function of the modifier is to direct the polymerization in such a manner that uniform, long chain polymers are produced with a minimum of cross-linkages between polymer molecules. Cross-linkage between the polymer units leads to the formation of gel-type products and consequently to undesirable characteristics in the polymer. Alkyl mercaptans, particularly high molecular alkyl mercaptans containing from 12 to 18 carbon atoms per molecule, have been found highly effective as modifiers.

Among the unsaturated organic compounds which are capable of copolymerizing with butadiene hydrocarbons in an aqueous emulsion are: aryl olefins and substituted aryl olefins (e. g., styrene, p-chlorostyrene, p-methoxystyrene, vinyl naphthalene, and the like); alkyl esters of acrylic acids (e. g., methyl acrylate, methyl methacrylate, butyl acrylate, and the like); nitriles of acrylic acids (e. g., acrylonitrile, methacrylonitrile, and the like); vinylidine chloride; vinyl ketones (e. g., methyl vinyl ketones); vinyl ethers; vinyl carbazole; vinyl furan; vinyl pyridine; and the like.

An object of the present invention is to provide an improved process for the polymerization of diolefins. Another object is to provide an improved process for the copolymerization of a butadiene hydrocarbon and an organic monomer copolymerizable therewith in an aqueous emulsion. Another object of the present invention is to provide a new process particularly applicable to the polymerization of butadiene hydrocarbons in an aqueous emulsion to produce high molecular weight polymers of superior homogeneity. A further object is to provide improved high molecular weight polymers from unsaturated organic monomers. Other objects and advantages of the present invention will be evident from the following detailed description and the accompanying drawing.

The accompanying figure illustrates graphically comparative physical properties of butadiene-styrene copolymers produced in accordance with the present invention in contrast to the physical properties of a butadiene-styrene copolymer produced by the conventional method.

The present invention provides an improved process for the manufacture of rubber-like high molecular weight polymers of unsaturated organic compounds. By the process of the present invention synthetic rubbers may be produced by the emulsion polymerization of diolefins and monomers copolymerizable therewith; e. g., butadiene-styrene polymers of the GR–S type having improved properties may be produced. These improved results are accomplished by control of the modification of the polymer throughout the polymerization reaction. The rate of modification is maintained at the desired level by the control of the concentration of a selected modifier in the reaction mixture and control of the rate of diffusion of said modifier to the reaction locus. In a copending application of W. A. Schulze, Serial No. 610,605, filed August 13, 1945, and now U. S. Patent No. 2,490,713, a method for controlling the modifier action during emulsion polymerization reactions was disclosed. By the process of the present invention even better control of the modification of the polymers during the polymerization reaction is secured, and this invention represents an improvement over the invention of said copending application. By the method of the said application the action of specific types of modifiers is maintained at the desired rate by control of the rate of diffusion of the said modifiers to the reaction locus by regulated agitation of the system during the course of the polymerization reaction.

While reaction of a mercaptan modifier with the polymer is effectively controlled during most of the polymerization reaction by thus regulating the rate of agitation, there is generally a substantial amount of low molecular weight polymer produced in the early stages of the process. During this portion of the polymerization reaction the concentration of modifying agent is at its highest level, comprising an amount sufficient to modify the total polymer produced. Furthermore, agitation must at all times be maintained at a rate sufficient to prevent phase separation and secure adequate emulsification of the reactants.

In the process of the present invention by control of the concentration of mercaptan in the polymerization mixture concurrently with regulation of the rate of agitation of the system, the diffusion of modifier to the reaction locus can be maintained at an optimum level in all stages of the reaction. Thus when specific types of modifying agents are employed such that the average molecular weight of the polymer produced is substantially in inverse ratio with the rate of diffusion to the reaction locus, highly homogeneous products are obtained. By the method of our invention, the amount of mercaptan incorporated in the initial mixture is sufficient only for optimum modification of polymer produced in the earlier stages of the polymerization reaction. As the reaction proceeds, further addition of the mercaptan is made with a suitable increase in the rate of agitation when the increment is added.

In a conventional technique for the production of GR–S rubber, an emulsion is prepared by agitation of the following recipe:

| | Parts |
|---|---|
| Butadiene | 75 |
| Styrene | 25 |
| Soap | 5 |
| Potassium persulfate | 0.3 |
| Water | 180 |
| Mercaptan | Variable |

The quantity of mercaptan employed in the recipe varies somewhat depending upon the specific mercaptan employed and the desired characteristics of the polymer. In general, from 0.4 to 0.7 part primary dodecyl mercaptan (DDM) is employed. The total quantity of the mercaptan is added to the monomers prior to emulsification. Polymerization is effected at a temperature of 50° C. (122° F.) for approximately twelve hours, or until a conversion of about 75 per cent is obtained. The mercaptan dissolves in the oil phase before agitation begins and when the emulsion is formed, is distributed in the dispersed phase. Thus substantially all of the modifier present in the initial mixture is dispersed to the reaction locus when emulsification takes place. At this stage of the reaction, control of the rate of modification can be effected by reducing the concentration of mercaptan present and maintaining a rate of agitation sufficient only to prevent phase separation as disclosed in the aforementioned copending application.

In the past, increment addition of modifiers to a polymerization during the reaction has generally been ineffective. The quantity of mercaptan comprising the increments is small and its effective dispersion and distribution is usually difficult from a purely mechanical viewpoint. By the method of the present invention, a desired mercaptan increment is added before the soap in the original mixture is lost by adsorption on the polymer. By a suitable increase in the rate of agitation beginning at the time the addition is made and continued thereafter, dispersion and distribution of the modifying agent can be effected as desired. Thus by adding only a portion of the total amount of mercaptan modifier initially and by adding the remainder after the polymerization reaction has progressed to a limited degree, and then increasing the rate of agitation, the modifying action of the mercaptan is effectively regulated.

When the methods of our invention are employed in the introduction and dispersion of those types of modifying agents with which the modifying effect varies substantially in direct ratio with their rate of diffusion to the reaction locus, particularly desirable qualities are provided in the polymers produced. In general, we prefer high molecular weight tertiary alkyl mercaptans as modifiers, and in particular, blends or concentrates of tertiary hexadecyl mercaptans. The advantages of these compositions have been disclosed in a copending application of W. A. Schulze and W. W. Crouch, Serial No. 591,868, filed May 4, 1945, and now U. S. Patent No. 2,493,268, to which reference is made.

In one specific embodiment, the invention comprises emulsifying a conventional GR–S recipe in which about 0.75 part of a hexadecyl mercaptan concentrate is included as the modifying agent. Agitation of the mixture is effected by a marine type propeller operated at a speed sufficient only for efficient emulsification of the system. In a typical laboratory reactor using a marine type propeller this was determined as about 100 R. P. M. At the end of about two hours, or when approximately ten per cent conversion of the monomers obtains, an increment of about 0.6 part of the mercaptan blend is added, preferably dissolved in styrene. Concurrently with this addition, the rate of agitation is increased (e. g., to about 200 R. P. M.), at which rate it is maintained until the desired conversion is secured, say about 80 per cent.

As is well known in the art, the polymers most desirable for use in the manufacture of the best quality synthetic rubber should be substantially homogeneous with as little material of extremely low or extremely high molecular weight as possible. Since intrinsic viscosities furnish an indication of the average molecular weight of the polymer produced, the course of a reaction can be followed from measurements made at intervals during the polymerization. In the accompanying figure, intrinsic viscosity curves are shown for reactions conducted under the following conditions: (1) modified in the conventional manner, employing a primary $C_{12}$ mercaptan (DDM); (2) modified with tertiary hexadecyl mercaptan blend incorporated in the original mixture but with controlled agitation rates to regulate diffusion of modifier to the reaction locus; (3) modified according to the methods of the present invention, i. e., a portion of the modifier, comprising a tert-$C_{16}$ mercaptan blend, incorporated in the initial mixture, and the remainder added after about two hours, with the rate of agitation increased when the increment was made.

The advantages of our invention will be apparent from the higher, flatter intrinsic viscosity curve obtained, which indicates the homogeneous nature of the polymer produced. The substantial absence of low molecular weight polymer at the beginning of the reaction as well as of high molecular weight product in the final stages are particularly significant. A further important advantage lies in the large portion (in this instance about 80 per cent) of the polymer in which average molecular weight is substantially constant.

By suitable variation in the quantity of modifier initially added, the amount incrementally added, and the rate of agitation, substantially homogeneous polymers of higher or lower molecular weight can be produced, or, if desired, of a predetermined degree of variation in molecular weight. By carrying out the polymerization in a series of reactors, these interdependent variations in conditions may be advantageously effected and this method of operation is within the scope of our invention.

The method of agitation may be by any suitable means, including stirring, rocking, and the like, but should be of such nature that thorough mixing and contacting of the reactants can be secured without violent churning or beating effects, and should be adjustable in rate. The speed of agitation during the early stages of the reaction should be at a rate sufficient only for effective emulsification. In general, the higher rate employed after adding the modifier increment will be about double that employed in the earlier stage.

In accordance with the present invention when employing a hexadecyl mercaptan as a modifier, preferably from about 0.5 to about 1.0 per cent by weight hexadecyl mercaptan, based on the weight of the monomer, is added to the original charge and from about 0.3 to about 0.8 per cent by weight additional hexadecyl mercaptan is added during the course of the polymerization. The additional hexadecyl mercaptan is added after about 2 hours under conventional conditions or when approximately 10 per cent monomer conversion is attained. Preferably, the rate of agitation is increased simultaneously with the addition of the supplemental quantity of the mercaptan.

The rates of agitation expressed in revolutions per minute throughout this application relate to the conventional five gallon reactor. These are well known in the art. The reactor is a glass lined, internally agitated autoclave equipped with a six inch, three bladed, marine type propeller having approximately 30° pitch.

While in the particular embodiment of our invention herein disclosed, the incremental addition of modifier is effected in a single addition, the process is not limited to this method of operation. Increments may be added at any time during the earlier stages of the reaction, that is, previous to the substantially complete imposition of soap on the polymer. This occurs at from about 10 to about 13 per cent conversion in a standard GR-S recipe; preferably, the increment addition of modifier in accordance with this invention is accomplished prior to or at about 10 per cent conversion. In a continuous type process, it may be desirable to provide two or more reactors in a series, into which constant addition is made, with suitable variations in the rate of agitation to effect the desired diffusion of the modifying agent to the reaction locus.

Example I

A polymerization mixture was prepared according to a standard GR-S recipe, in which 0.75 part of tertiary hexadecyl mercaptan blend was incorporated as the modifying agent. The mixture was emulsified by agitation with a marine type propeller operated at a speed at 100 R. P. M. After two hours under standard polymerization conditions 0.55 part of the mercaptan blend were added as a solution in 100 cc. of styrene. Concurrently with the addition of the increment of modifier, the rate of agitation was increased to 200 R. P. M. The conversion after 12.8 hours reaction time was 77.3 per cent and the Mooney viscosity of the product 43. Intrinsic viscosities obtained during the polymerization were as follows:

| Conversion | 5.9 | 9.1 | 12.1 | 18.0 | 29.5 | 43.5 | 56.7 | 69.5 | 77.1 |
|---|---|---|---|---|---|---|---|---|---|
| Intrinsic viscosity | 1.95 | 1.98 | 2.23 | 2.35 | 2.24 | 2.19 | 2.01 | 2.03 | 2.05 |

Example II

The above experiment was repeated using duplicate batches, in one of which the total amount of modifying agent was added initially, the other in increments as before. In each instance the rate of agitation was increased from 100 to 200 R. P. M., the increments being added in the second batch before increasing the rate of agitation. Intrinsic viscosities obtained during the reactions were as follows:

| Batch 1, 1.3 part t-$C_{16}$ mercaptan initially added | | Batch 2, 0.8 part t-$C_{16}$ mercaptan plus 0.6 part at 2 hours | |
|---|---|---|---|
| Conversion | Int. Vis. | Conversion | Int. Vis. |
| 5 | 1.17 | 4.8 | 1.87 |
| 10 | 1.34 | 9.8 | 2.35 |
| 20 | 1.55 | 15.7 | 2.18 |
| 30 | 1.70 | 27.6 | 2.20 |
| 45 | 1.88 | 40.3 | 2.27 |
| 60 | 2.03 | 54.0 | 2.15 |
| 70 | 2.18 | 67.3 | 2.22 |
| 77 | 2.30 | 76.0 | 2.24 |

Example III

For comparison, polymerization was carried out according to a standard GR-S recipe, in which 0.46 part primary dodecyl mercaptan was used as a modifier. The polymerization was carried out with agitation at a propeller speed of 300 R. P. M. throughout. Intrinsic viscosities obtained during the polymerization were as follows:

| Conversion | 19.6 | 32.8 | 47.0 | 57.8 | 67.2 | 80.0 |
|---|---|---|---|---|---|---|
| Intrinsic viscosity | 0.54 | 0.80 | 1.05 | 1.28 | 1.48 | 2.26 |

Since certain changes may be made in carrying out the above process without departing from the scope of the invention, it is intended that all matter contained in the foregoing description of the invention shall be interpreted as illustrative and not in a limiting sense.

We claim:

1. A process for the production of a copolymer of butadiene and styrene which comprises forming an aqueous emulsion of butadiene and styrene, carrying out the polymerization of said butadiene and styrene at a temperature within the range of from about 80 to about 125° F. in the presence of a minor proportion of a tertiary hexadecyl mercaptan, agitating said emulsion at a rate sufficient only to maintain said emulsion at the beginning of the polymerization reaction, adding an additional quantity of said mercaptan to said emulsion when the polymerization reaction has reached approximately 10 per cent monomer conversion and simultaneously doubling the rate of agitation of said emulsion.

2. A process for the production of a copolymer of butadiene and styrene which comprises emulsifying said butadiene and styrene together with from about 0.5 to about 1.0 per cent by weight tertiary hexadecyl mercaptan, agitating said emulsion at a rate sufficient only to maintain the emulsion until approximately 10 per cent monomer conversion is attained, thereafter adding from about 0.3 to about 0.8 per cent by weight additional tertiary hexadecyl mercaptan, and increasing the agitation during the remainder of the polymerization period to a rate substantially double the initial rate of agitation.

3. A process for the production of a copolymer of butadiene and styrene which comprises forming an aqueous emulsion containing 75 parts butadiene by weight, 25 parts styrene by weight and 0.75 part tertiary hexadecyl mercaptan by weight, carrying out the polymerization of said butadiene and styrene in the presence of an oxidation catalyst with sufficient agitation only to maintain said emulsion until about 10 per cent monomer conversion is attained, adding about 0.6 part of tertiary hexadecyl mercaptan and concurrently increasing the rate of agitation to about double the initial rate and maintaining the rate of agitation at said higher rate during the remainder of the polymerization period.

WALTER A. SCHULZE.
JAMES E. TROYAN.

REFERENCES CITED

The following references are of record in the file of this patent:

UNITED STATES PATENTS

| Number | Name | Date |
|---|---|---|
| 2,281,613 | Wollthan | May 5, 1942 |
| 2,378,030 | Olin | June 12, 1945 |
| 2,397,201 | Pfau | Mar. 26, 1946 |
| 2,430,562 | Fryling | Nov. 11, 1947 |
| 2,434,536 | Arundale | Jan. 13, 1948 |
| 2,445,970 | Reinhardt | July 27, 1948 |

Certificate of Correction

Patent No. 2,523,596            September 26, 1950

WALTER A. SCHULZE ET AL.

It is hereby certified that error appears in the printed specification of the above numbered patent requiring correction as follows:

Column 6, line 44, for the numeral "77.1" read *77.5*; line 45, for "2.05" read *2.01*; column 7, line 7, for "80.0" read *80.6*; line 8, for "2.26" read *2.20*; and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*